Sept. 2, 1958   P. Q. FORSTER   2,849,836
HOLDER FOR FLOWER ARRANGEMENT
Filed Sept. 18, 1953
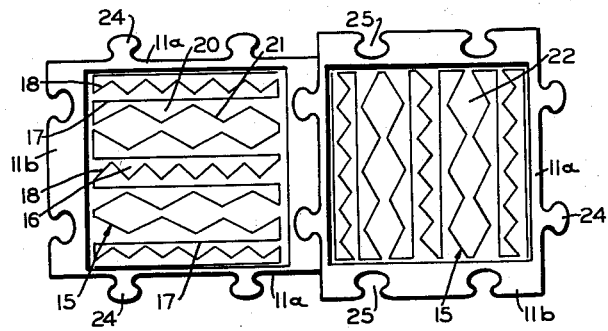
FIG_1
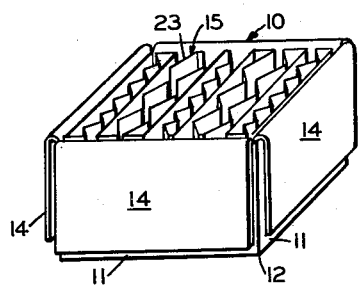
FIG_2
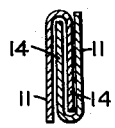
FIG_3
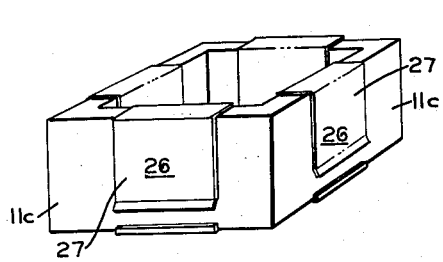
FIG_4
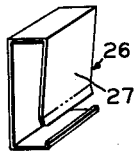
FIG_5
INVENTOR.
PAUL Q. FORSTER
BY
ATTORNEY

2,849,836

HOLDER FOR FLOWER ARRANGEMENT

Paul Q. Forster, San Francisco, Calif.

Application September 18, 1953, Serial No. 381,088

6 Claims. (Cl. 47—41)

The present invention relates to holders for flower arrangement, commonly known as flower frogs, and particularly those which may be quickly and firmly attached together to accommodate any size or shape in the horizontal plane.

Most flower frogs available on the market represents individual items having uniform perforations or apertures, or uniformly spaced spikes, which are wholly incapable of being joined together in temporary engagement. There are a few types of flower frogs which are adapted for interlocking unit arrangement, but these either require a central unit, which remains unchanged, or requires a change in altitude in order to accomplish the interlocking feature. The disadvantages of these latter forms more than outweigh any advantages secured in the interlocking arrangement.

Accordingly, it is among the objects of the present invention to provide individual and uniform flower frog units which function independently, but which are capable of being locked together in a variety of patterns in a horizontal plane, to increase the surface area available for flower arrangement.

It is also an object of the present invention to provide flower frogs of uniform independent units capable of interlocking one with another without the necessity of increasing the altitude of the holder group.

It is a further object of the present invention to provide uniform individually functioning flower frogs which do not require any central member on which the other members depend for increasing the surface area.

Another object of the present invention is to provide flower frog units which are easily and quickly coupled and detached and which do not require nesting to accomplish the increase of surface area.

It is still another object of the present invention to provide a proper support for flower arrangements, whether used in individual units or in multiple units secured together.

Another object of the present invention is to provide flower frog units which have flexible spring centers capable of distortion to accommodate solid stems or twigs which have larger diameters than any of the diameters provided in the normal range of openings provided.

Another object of the invention is to provide an individual functioning unit for flower arrangements of a relatively small surface area, having a variety of apertures for receiving different sized flower stems.

Another object is to provide individual units for flower arrangements where the divisions between the individual apertures are formed with a sharp edge, both at top and bottom, which will cut into the stems of flowers to support the same, and which, therefore, may be used with equal facility with either the top or bottom surface exposed.

Further objects are to provide a construction of maximum simplicity, economy and ease of manufacture, and also such further objects, advantages, and capabilities as will fully appear and as are inherently possessed by the device and the invention described herein.

The invention further resides in the combination, construction and arrangement of parts illustrated in the accompanying drawings, and while there is shown therein a preferred embodiment and two variant forms thereof, it is to be understood that the same is merely illustrative of the invention, and that the invention is capable of further modification and change and comprehends other details of construction without departing from the spirit thereof, or the scope of the appended claims.

Referring to the drawings:

Figure 1 shows a plan view of two individual units joined together with male and female cooperating locking means.

Figure 2 is a perspective view of the preferred form of flower arrangement unit.

Figure 3 is a side elevation of fragments of two units, similar to that shown in Figure 2, and illustrating the manner of interlocking the units.

Figure 4 is a perspective view of still another individual form with the center portion removed and showing separable clips for joining the units together.

Figure 5 is a perspective view of one of the individual clips shown in Figure 4.

Referring now more particularly to the drawings in which like reference numerals indicate like parts in the several views, and with particular reference to Figure 2 in which the preferred form is shown, the individual unit flower frog, which is generally indicated by the numeral 10, comprises a substantially rectangular shell with vertical walls 11, which is preferably formed by bending a strip of rust resisting metal to the desired form and soldering or otherwise securing the same together at the corner 12. In the form shown in Figure 2, each of the four walls or sides has an integral portion folded back on itself outwardly to form a leaf 14 which is spaced from the side 11 thereof, a sufficient distance to provide a slip fit for another such leaf 14 in reverse position, as shown in Figure 3. Obviously, the leaves 14 of any such unit need not all connect at the top, but may be connected on opposing sides at the top and at the bottom, respectively.

The center portion 15 is formed of a strip of plated or otherwise rustproof spring steel, preferably having a width substantially equal to the height of the walls 11, and formed with forming dies with transverse convolutions so that when it is bent in a serpentine manner it will provide a variety of sizes of vertical apertures for receiving flower and leaf stems, three of which are shown in Figures 1 and 2. One size aperture 16 is that formed by the vertical passes 17 and the wavy passes 18. Another size aperture 20 is formed by the larger wavy passes 21 and the vertical passes 17, and a third size aperture 22 is formed between the larger wavy passes 21 themselves. The formed center portion 15 is merely slipped into place and its natural expansion holds it in position within the vertical walls 11 of the main body.

It is clear that when the form of the central member 15 is a square or rectangle, all of the surface area is made available for use in the flower arrangements, and that the same pattern and surface is presented at both top and bottom. Likewise, the central spring member 15, being of relatively thin section material, presents a lateral sharp edge 23 at both the top and bottom of the unit. A sufficiently sharp edge is obtained merely by cutting the spring material into strips prior to forming in the desired manner as explained above.

It will be observed that small stemmed flowers may be inserted in the smaller openings 16 and that medium size stemmed flowers may be inserted in the next larger sized openings 20, and that large stemmed flowers may be inserted in the openings 22, which are the largest size shown in the drawings. Very large stemmed flowers, such as Calla lilies, and some iris can be impaled by pressing the stems against the sharp edge 23 of the various forms of the passes, which cut into the stems and hold them in the desired location and position. If larger solid stemmed items, such as twigs and small branches are used in the flower arrangement which cannot be cut by the sharp edges 23, they can be forced into the openings, the largest openings especially, and because of the resilient character of the spring member 15, the openings can be distorted sufficiently to accommodate the increased diameter. The material, being spring material to begin with and formed into a resilient pattern, will return to its preformed position when the twig or other device distorting the normal pattern, is removed.

It is obvious that the center portion need not be formed into a square pattern, but may be formed into a spiral or other form, the outer diameter or dimension of which will fit within the walls 11. The preferred form is the serpentine square shown in Figures 1 and 2 because this form presents the greatest useful surface area.

Referring now to Figure 1, the device contains the same spring center member 15, but the walls 11a and 11b have a different section and present an alternate means for interlocking. The diametrically opposed walls 11a are formed with vertical locking lugs or male members 24, while the other two diametrically opposed walls 11b are of sufficient thickness or section to provide female vertical indentations 25 of a form and size to accommodate the male members 24 by a slip fit as shown in Figure 1. While the centers remain substantially rectangular, each individual unit, when locked in position, has a longer axis because of the thickness of the walls 11b. In the form shown in Figure 1, it is not necessary to accomplish the interlocking by hooking both of the male members 24 into the corresponding female members of the same unit. Obviously, each unit may be secured firmly together by hooking or slipping the lower male projection 24 into the upper slot of the adjoining unit to provide a staggered arrangement or design.

In Figure 4 the four vertical walls 11c are substantially of the same cross section and are shown thicker than the others in the previous views to provide a little more weight to each unit if desired. A removable clip 26 is provided which can be attached to each of the side walls 11c in the manner indicated in Figure 4, to provide a spring clip member or leaf 27. Although it is not shown in Figure 4, the same center spring member 15 is used and slipped in place with frictional engagement. Here also, the individual units may be joined together by turning the adjoining unit upside down and running the spring leaf 26 under the spring leaf of the adjoining member or unit. This firmly holds the two units together and since the spring member 15 presents the same surface pattern both top and bottom, it makes no difference whether it is used upside down or rightside up. It is important to note that in joining members or units shown in Figure 4 together to form a pattern, that they need not be joined in the same precision as required in Figure 1. They may be offset in either direction in the horizontal plane in any degree within the limits of the width of the clip 26 and its spring leaf 27.

Likewise, it should be pointed out that in joining units of the preferred form shown in Figure 2, they may be joined in any position with respect to one another, on any side, and within any degree of adjustment within practically the entire limit of the width. The number of combinations and arrangements is practically limitless and can be worked with any number of units to form uncounted designs of multiple units firmly secured together to fit any conceivable shape. It will be observed that all this is accomplished quickly and with great ease, and while the coupling of the units together is firm and secure, nevertheless, they are readily uncoupled without the use of tools or anything but a minimum of effort. Further, it is apparent that no matter what design is formed, there is no increase in altitude and all of the units are coupled in the lateral plane.

It is to be noted that if there is to be a hollow center portion for receiving the resilient member 15, that there must either be one wall which is represented by a circular figure or more than two walls represented by a geometric figure. Accordingly, even though the conventional form of a rectangle is shown for the shape of the body, it is to be understood that a single wall form may be used or a figure represented by three or more sides may be used, or combinations of both.

In another form of the invention the holding means at the sides may be magnetic attraction. By magnetizing the side walls the units can be instantly secured together, or separated and the fact that they are subject to immersion does not appear to diminish this coupling.

I claim:

1. A cut flower arrangement until comprising three or more vertical side walls which are joined together, attaching means in said walls for cooperation with similar attaching means of a similar unit for securing them together, and a thin walled metallic resilient member within said walls formed so that its lateral edges provide apertures therethrough from top to bottom and present substantially the same edge and aperture surface pattern both top and bottom.

2. A cut flower arrangement unit for use immersed in water comprising three or more vertical side walls which are joined together, integral leaf means on said walls for interlocking with similar integral leaf means of a similar unit for securing them together, and a thin walled waterproof resilient member within said walls formed so that its lateral edges provide apertures completely therethrough and make available substantially the same edge and aperture surface pattern both top and bottom.

3. A unit cut flower arrangement device comprising a single wall, attaching means on said wall cooperating with similar attaching means on a similar unit for securing them together, and a thin walled waterproof resilient member within said wall formed so that its lateral edges provide yielding apertures through said device and present substantially the same edge and aperture surface pattern both top and bottom.

4. A cut flower support unit adapted to be used in multiples comprising a hollow body member having more than two vertical walls joined together, attaching means on said walls for cooperation with similar attaching means of a similar unit for securing them together in the same horizontal plane, a thin walled waterproof resilient member having sharp lateral edges and formed with lateral convolutions and in serpentine form providing yielding apertures through said device for frictional engagement against said walls within said hollow center thereof and presenting substantially the same surface design of sharp edges and apertures both top and bottom.

5. A cut flower support unit adapted to be used in multiples comprising a hollow body member having a single vertical wall, attaching means on said wall for cooperation with similar attaching means of a similar unit for securing them together in the same horizontal plane, a thin walled waterproof resilient member having sharp lateral edges and formed with lateral convolutions and in spiral form with through apertures therebetween for frictional engagement against said wall within said hollow center and presenting substantially the same surface design of sharp edges and apertures both top and bottom.

6. A cut flower support unit adapted to be used in multiples comprising a hollow body member having more than two vertical side walls joined together, leaf means on said walls for cooperation with similar leaf means of a similar unit for securing them together in the same horizontal plane, a thin walled rustproof resilient member having sharp lateral edges and formed with lateral convolutions and in irregular serpentine form with through apertures therebetween for frictional engagement against said walls within said hollow body and making available substantially the same surface design of sharp edges and apertures both top and bottom.

References Cited in the file of this patent

UNITED STATES PATENTS

| | | |
|---|---|---|
| 706,258 | Sanders | Aug. 5, 1902 |
| 986,395 | King | Mar. 7, 1911 |
| 2,062,577 | Kaplan | Dec. 1, 1936 |
| 2,146,784 | Wilson | Feb. 14, 1939 |
| 2,219,870 | Jacobus | Oct. 29, 1940 |
| 2,261,326 | Atkisson et al. | Nov. 4, 1941 |